Sept. 29, 1931.  W. H. TOBIN  1,825,488

METHOD OF AND APPARATUS FOR HANDLING FIRE HOSE

Filed April 5, 1929

Inventor.
William H. Tobin
by
atty

Patented Sept. 29, 1931

1,825,488

UNITED STATES PATENT OFFICE

WILLIAM H. TOBIN, OF BOSTON, MASSACHUSETTS

METHOD OF AND APPARATUS FOR HANDLING FIRE HOSE

Application filed April 5, 1929. Serial No. 352,867.

This invention relates to methods and apparatus for handling fire hose and for loading it into a hose truck and into a hose tower.

Fire hose is usually made in short lengths, as fifty feet, with the ends provided with male and female coupling members, respectively, so that any number of lengths can be coupled together. A fire station usually has two sets of hose. One set is contained in the hose truck so that the truck is in instant readiness to depart on a fire call. In the truck the lengths of hose are connected together and are arranged in loop form so that the hose can be pulled out of the truck without trouble. The other or spare set of hose is in separate lengths arranged in rolls which are kept in the station house in readiness to be loaded into the truck.

After a hose truck returns from a fire, the used and wet hose, which then is in separate rolls with the male coupling members innermost, is pulled out of the truck onto the floor of the station and the rolls are unwound and the lengths are hung up in the hose tower to dry, and, when dry, are rolled up with the female ends innermost. When the truck is emptied of hose, it is immediately reloaded with the dry spare set of hose so that the truck can go out again immediately, if a second call should come in. The usual manner of reloading the truck is to throw the spare rolls of hose onto the floor of the fire station and to unwind the rolls on the floor and to draw the hose into the truck from the floor. The floor of the station has become wet because of the water deposited thereon by the used hose and also because of water drained onto the floor from other apparatus so that the dry hose in the spare rolls becomes wet by being unwound on the floor. Chemical tanks usually also have to be recharged and sulphuric acid in inevitably spilled onto the floor and thus comes in contact with the hose. While the truck must be immediately reloaded with hose in preparation for an immediate call for service, it may be some time before a second call comes in. During this time the spare set of hose remains in the truck in wet condition. Fire hose is expensive and is subject to rapid decay since it will soon rot if moisture and acid is allowed to remain on and in the fibrous covering. Consequently, it is highly desirable to keep the hose dry at all times except when it is in actual service.

Therefore, it is an object of the present invention to provide a method of handling hose whereby the dry rolls of hose in the station can be unwound and laid into the hose truck without coming in contact with the wet floor of the station.

A further object of the invention is apparatus and especially a turntable on which the spare rolls of hose can be piled in superimposed order in such manner that the rolls can be unwound successively and laid into the hose truck without the hose coming in contact with the wet station floor and also without being unintentionally pulled off the turntable.

A further object of the invention is generally to improve methods and apparatus for handling fire hose which reduces the number of men that are necessary to unload and reload the truck, so that men can be released for other services necessary to restore the apparatus rapidly in condition to respond to another call.

It is usual practice to leave the unloaded wet hose in rolls until the dry hose is loaded into the truck. The wet hose of the rolls is then drawn up into the tower to drain and dry. This is usually done by hooking a hoisting cable to the outer end of a roll of hose when it is on the floor and then elevating the cable. By this method the hose leaves the roll in twists and kinks which must be taken out of the hose and the formation of which, furthermore, unnecessarily wears the hose.

In accordance with my invention, I place the rolls of wet hose onto the turntable, after it has been used to load the dry rolls of hose into the truck. The turntable rotates as the hose is drawn into the tower and so the hose is caused to be withdrawn and to hang in the tower free from twists and kinks. This constitutes a further object of the invention.

The spare set of hose in the station house is contained in separate rolls 10, each roll containing a certain length, as fifty feet, of hose. One end of each length of hose is provided with a female coupling member 12 and the other end with a male coupling member 14. The length of hose in each spare roll is wound up with usually the female coupling member innermost and the male coupling member outermost, as illustrated in Fig. 3.

Figure 1:
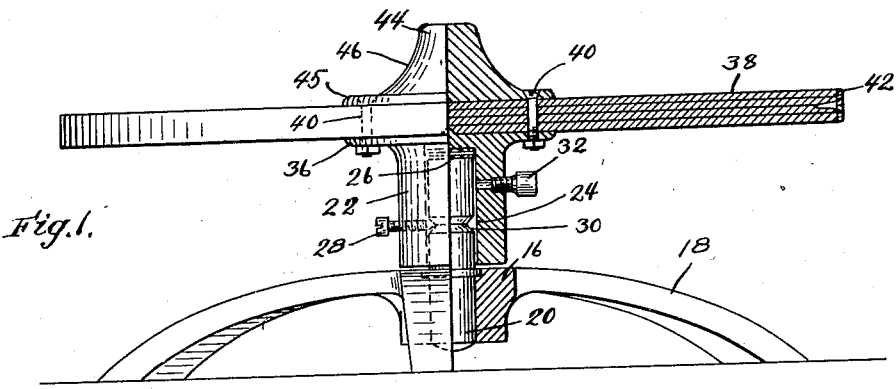
Fig. 1 is a side elevation, partly in section, of a turntable used in connection with the invention.
Figure 2:
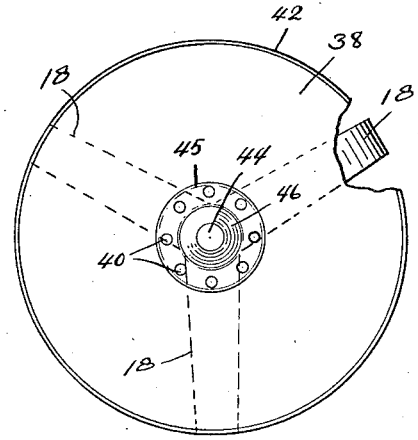
Fig. 2 is a plan view of the turntable of Fig. 1.

In accordance with this invention, a turntable is provided to support the rolls of hose above and out of contact with the wet station floor while the rolls are being unwound and the hose laid into the body of the truck. The turntable, illustrated particularly in Figs. 1 and 2, includes a base 16 having supporting legs 18 and a vertical shaft 20 which is fixed to the base. The turntable includes a hub 22 which has a vertical recess 24 therein in which the shaft 20 is received. A ball bearing 26 is located between the upper end of the shaft 20 and the bottom of the recess and provides rotatable supporting means for the hub. A set screw 28 is carried by the hub and extends into an annular groove 30 in said shaft whereby to connect the shaft and hub against accidental displacement. Suitable lubricating means as a grease cup 32 is provided to lubricate the bearing between the hub and the shaft. The hub is provided at its upper end with a radially outstanding flange 36 upon which a circular table 38 is received and secured by bolts 40 which pass through said table and through said flange 36. The table 38 is sufficiently large in diameter to receive and support a roll of hose, and preferably, although not necessarily, is of a laminated wood construction, as shown, and has a metal band or tire 42 which encircles and reinforces its periphery. A generally conically-shaped projecting member 44 is carried by and upstands above the upper face of said table 38 in the middle thereof and has a downwardly and outwardly sloping side wall 46 and an outstanding flange 45 at the bottom through which the bolts 40 are passed, whereby to clamp said member and table to said hub.

Figure 3:
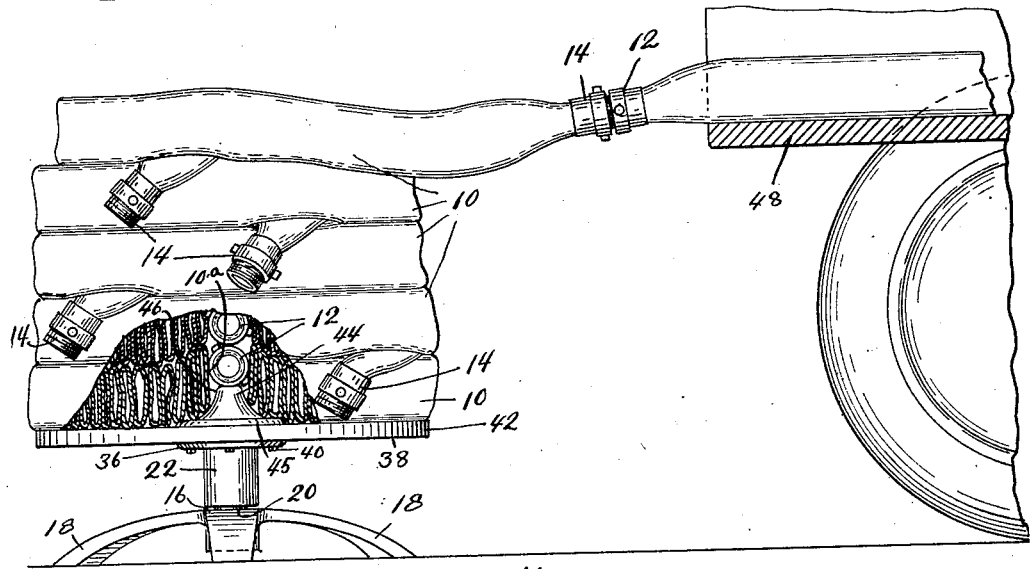
Fig. 3 is a side elevation, partly in section, showing the manner in which the rolls of hose are supported in a vertical pile on the turntable and are unwound and laid into the body of the hose truck.

The method of using the turntable is substantially as follows:

The rolls 10 of hose are placed one on top of the other in a vertical pile on the turntable with the outer end of each length of hose thrown over the roll, as shown in Fig. 3, so that the weight of the superimposed rolls holds the ends from unwinding. The inner coupling member 12 of the lowermost roll rests upon the upstanding conical member 44 so that it is held in an elevated position at least partly above the top of the roll. The sloping side wall 46 of said member also engages the innermost convolutions 10a of the lowermost roll and also raises them above the top surface of the body of the roll. The projecting member 44 thus enters the roll and holds it against lateral displacement as the turntable is rotated. When the next upper roll is placed upon the bottom roll the elevated inner coupling member and the elevated inner convolutions of the lowermost roll serve to raise upwardly the corresponding coupling member and convolutions of the next upper roll. Thus, all the rolls of the stack become interlocked, one with another, so that they will not readily move sidewise as the turntable and rolls are rotated and hose is withdrawn from the rolls.

After the wet hose has been removed from the hose truck 48 onto the floor of the station, and has been removed, the hose on the turntable is then unwound and laid in the truck. In accomplishing this, the outer end of the top roll of hose is engaged and pulled toward the truck. The turntable rotates to permit this movement. The hose is laid in the truck in loop form until the first length of hose has been passed into the truck. The inner end, or the female coupling member of the first length of hose, is then coupled to the outer or male coupling member of the next lower roll of hose, which is now the top roll, and the action is repeated until all of the rolls have been unwound and the lengths thereof coupled together and laid into the truck. By using this method, and the turntable, it will be seen that the dry hose can be laid into the truck without coming in contact with the wet floor of the station. Fewer men are required to load the truck, as those heretofore utilized to unroll the hose on the floor and take the kinks and loops out of it, are now unnecessary and can be released for other necessary duties.

The manner of utilizing the turntable for hoisting the wet hose into the tower for draining and drying can be readily understood without the need for specific explanation.

I claim:

1. The method of transferring fire hose from separate rolls of hose into the body of a fire truck wherein the hose is differently arranged and the lengths are connected together by the use of a rotatable horizontal support, the convolutions of each roll being in a common plane with one convolution against and in contact with the next adjacent convolution and with one end innermost and the other end outermost, which method consists in stacking the separate rolls of hose horizontally in superimposed order on the rotatable support, withdrawing hose from the uppermost roll on said support by rotating the stack and moving the hose into the body of the truck, connecting the free end of the length of hose in the truck with the outer end of the hose of next lowermost roll in the stack and continuing as aforesaid until all of the hose on the support has been moved into the truck.

2. The method of transferring fire hose from separate rolls of hose into the body of a fire truck wherein the hose is differently arranged and the lengths thereof are connected together by the use of a rotatable horizontal support, the convolutions of each roll being in a common plane with one convolution against and in contact with the next adjacent convolution and with one end innermost and the other end outermost, which method consists in arranging the separate rolls of hose horizontally in superimposed order in a vertical stack on the rotatable support, interlocking the convolutions of one roll with the next roll by raising the innermost convolutions of a roll partly above the general horizontal plane of the top face of the roll and consequently forming a depression in the lower face of the roll into which the raised convolutions of the next lower roll nest, and withdrawing hose from the successive uppermost rolls by rotating said support.

3. The method of transferring fire hose from separate rolls of hose into the body of a fire truck wherein the hose is differently arranged and the lengths thereof are connected together the convolutions of each roll being in a common plane with one convolution against and in contact with the next adjacent convolutions and with one end innermost and the other end outermost, which method consists in arranging the spare rolls of hose horizontally in superimposed order in a vertical stack, and withdrawing hose from the successive uppermost rolls by rotating the stack of hose.

4. The method of transferring fire hose from separate rolls of hose into the body of a fire truck wherein the hose is differently arranged and the lengths thereof are connected together by the use of a rotatable horizontal support, the convolutions of each roll being in a common plane with one convolution against and in contact with the next adjacent convolution and with one end innermost and the other end outermost, the rotatable support having an upstanding projection in the axis thereof that is shorter than the thickness of a roll, which method consists in placing a roll of hose axially upon said support and over said projection whereby the inner convolutions of said roll are raised above the top of the roll by said projection, placing other rolls in superimposed order on top of said first roll, whereby the elevated convolutions of the lower rolls raise the inner convolutions of the upper rolls and lock the rolls together against lateral displacement, and withdrawing hose from the successive uppermost rolls by pulling upon the outer end of hose of the successive rolls, whereby to cause said support to rotate and the rolls to unwind in succession.

5. The method of unwinding rolls of hose by the use of a horizontal turntable having an upstanding projection at the middle thereof the convolutions of each roll being in a common plane with one convolution against and in contact with the next adjacent convolution and with one end innermost and the other end outermost, which method consists in placing a roll of hose upon said turntable and over said projection so that said projection enters the middle of said roll and holds said roll against lateral displacement on the turntable, and withdrawing hose from the roll by pulling upon the outer end of hose, whereby to rotate the hose and the turntable and to cause the roll to unwind.

6. Apparatus for supporting and unwinding rolls of fire hose that are tightly wound upon one end of thereof including a base, a horizontal turntable rotatably supported by said base and adapted to support a roll of fire hose, said table having a projection which upstands above the middle thereof and is adapted to enter the middle of the roll of hose and raise the innermost convolutions and hold the roll on the turntable against lateral displacement, the height of the projection being such that the raised convolutions of the hose are retained in overlapping and engaging relation.

7. Apparatus for supporting and unwinding rolls of fire hose that are tightly wound upon one end thereof including a base, a horizontal turntable rotatably supported by said base and adapted to support a roll of fire hose, said table having a projection which upstands above the middle thereof and is adapted to enter the middle of the roll of hose and hold it on the turntable against lateral displacement, said upstanding projection being of generally conical configuration and having sloping side walls which engage and elevate and support the innermost convolutions of the roll of hose, the height of the projection being such that the raised convolutions of the hose are retained in overlapping and engaging relation.

8. Apparatus for supporting and unwinding rolls of fire hose that are tightly wound upon one end thereof including a supporting base having a vertically upstanding shaft, a hub rotatable on said shaft having at its upper end an annular outstanding flange, a circular turntable secured upon said flange and adapted to support a roll of hose as it is being unwound, and an upstanding hose-engaging projection carried by said turntable in the middle thereof and having at its lower end an annular outstanding flange which is fixed to said turntable, the height of said projection being such that the raised convolutions of the hose are retained in overlapping and engaging relation.

9. Apparatus for supporting and unwinding fire hose including a supporting base having a vertically upstanding shaft, a hub journalled on said shaft having an annular outstanding flange at its upper end, a turntable seated on said flange and adapted to support a roll of hose, and an upstanding and generally conically-shaped hose engaging member located on said turntable in the middle thereof and having downwardly and outwardly sloping side walls and an annular outstanding flange at its lower end, and bolts passed through both of said flanges and through said turntable, whereby to secure said flanges and turntable together.

10. Apparatus for supporting and unwinding rolls of fire hose that are tightly wound upon one end thereof including a rotatable turntable for supporting thereon a roll of hose, and having means which partially enters the roll of hose and supports it against lateral displacement and which also elevates the innermost portion of the roll partially above the upper surface thereof.

In testimony whereof, I have signed my name to this specification.

WILLIAM H. TOBIN.